(12) United States Patent
Minoura et al.

(10) Patent No.: US 9,025,250 B2
(45) Date of Patent: *May 5, 2015

(54) ANTIREFLECTION FILM, METHOD FOR MANUFACTURING ANTIREFLECTION FILM, AND DISPLAY APPARATUS

(75) Inventors: Kiyoshi Minoura, Osaka (JP); Takao Imaoku, Osaka (JP); Akinobu Isurugi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 805 days.

This patent is subject to a terminal disclaimer.

(21) Appl. No.: 13/138,544

(22) PCT Filed: Apr. 13, 2010

(86) PCT No.: PCT/JP2010/056592
§ 371 (c)(1),
(2), (4) Date: Sep. 1, 2011

(87) PCT Pub. No.: WO2010/122924
PCT Pub. Date: Oct. 28, 2010

(65) Prior Publication Data
US 2011/0317270 A1 Dec. 29, 2011

(30) Foreign Application Priority Data

Apr. 24, 2009 (JP) ................. 2009-107019

(51) Int. Cl.
*G02B 5/02* (2006.01)
*G02B 5/20* (2006.01)

(52) U.S. Cl.
CPC ............. *G02B 1/118* (2013.01); *G02B 5/021* (2013.01); *G02B 5/02* (2013.01); *G02B 5/201* (2013.01)

(58) Field of Classification Search
CPC ............ G02B 1/10; G02B 1/11; G02B 1/118; G02B 5/02; G02B 5/021; G02B 5/0215; G02B 5/0221
USPC .................................................. 359/599, 601
See application file for complete search history.

(56) References Cited

U.S. PATENT DOCUMENTS

| 4,190,321 | A |   | 2/1980 | Dorer et al. |
| 4,812,352 | A | * | 3/1989 | Debe ............................. 428/142 |
| 5,084,649 | A |   | 1/1992 | Sasao |
| 5,247,390 | A | * | 9/1993 | Hed ............................... 359/599 |
| 6,359,735 | B1 |  | 3/2002 | Gombert et al. |

(Continued)

FOREIGN PATENT DOCUMENTS

| CN | 101356454 | 1/2009 |
| EP | 2 056 129 | 5/2009 |

(Continued)

OTHER PUBLICATIONS

International Search Report.

(Continued)

*Primary Examiner* — Thong Nguyen
(74) *Attorney, Agent, or Firm* — Harness, Dickey & Pierce, P.L.C.

(57) ABSTRACT

An antireflection film is provided in which a light scattering property is suppressed. The antireflection film includes, on a surface thereof, a moth-eye structure including a plurality of convex portions such that a width between vertices of adjacent convex portions is no greater than a wavelength of visible light.

6 Claims, 15 Drawing Sheets

(56) References Cited

U.S. PATENT DOCUMENTS

| | | |
|---|---|---|
| 7,297,386 B2 | 11/2007 | Suzuki et al. |
| 7,897,243 B2 | 3/2011 | Matsumoto |
| 8,384,998 B2 * | 2/2013 | Taguchi et al. ............... 359/581 |
| 2003/0180476 A1 | 9/2003 | Yamashita et al. |
| 2003/0205475 A1 | 11/2003 | Sawitowski |
| 2004/0163441 A1 | 8/2004 | Sawitowski |
| 2004/0247800 A1 | 12/2004 | Yoshitake et al. |
| 2007/0159698 A1 | 7/2007 | Taguchi et al. |
| 2007/0236939 A1 | 10/2007 | Ouderkirk et al. |
| 2008/0129931 A1 * | 6/2008 | Takahashi et al. ............... 349/96 |
| 2008/0265149 A1 | 10/2008 | Endoh et al. |
| 2008/0304155 A1 | 12/2008 | Endoh et al. |
| 2009/0110804 A1 | 4/2009 | Ogawa et al. |
| 2009/0211912 A1 | 8/2009 | Taguchi et al. |
| 2009/0246494 A1 | 10/2009 | Matsumoto |
| 2009/0252825 A1 | 10/2009 | Taguchi et al. |
| 2010/0134892 A1 | 6/2010 | Endoh et al. |
| 2010/0328776 A1 | 12/2010 | Sanari et al. |

FOREIGN PATENT DOCUMENTS

| | | |
|---|---|---|
| JP | 3-196451 A | 8/1991 |
| JP | 11-281818 A | 10/1999 |
| JP | 2001517319 T | 10/2001 |
| JP | 2003-084106 A | 3/2003 |
| JP | 2003531962 T | 10/2003 |
| JP | 2004-59820 | 2/2004 |
| JP | 2004-59822 | 2/2004 |
| JP | 2005-258120 | 9/2005 |
| JP | 2005-331607 A | 12/2005 |
| JP | 2007-118449 | 5/2007 |
| JP | 2007-187746 A | 7/2007 |
| JP | 2007-240707 | 9/2007 |
| JP | 2009-020355 A | 1/2009 |
| JP | 2009-104103 | 5/2009 |
| WO | WO-2006059686 A1 | 6/2006 |
| WO | WO 2007/040159 | 4/2007 |

OTHER PUBLICATIONS

U.S. Office Action dated Apr. 13, 2012, issued in co-pending U.S. Appl. No. 13/315,321.

Office Action for co-pending U.S. Appl. No. 13/375,040 dated Oct. 1, 2014.

* cited by examiner

Background Art

ANTIREFLECTION FILM, METHOD FOR MANUFACTURING ANTIREFLECTION FILM, AND DISPLAY APPARATUS

TECHNICAL FIELD

The present invention relates to an antireflection film, a method for producing an antireflection film, and a display device. The present invention specifically relates to an antireflection film having a moth-eye structure which apparently prevents a change in the refractive index at the interface between the air layer and the antireflection film and which allows the incident light to pass through the antireflection film without any change; a method suitable for producing such an antireflection film; and a display device comprising such an antireflection film.

BACKGROUND ART

Displays such as cathode ray tube (CRT) displays, liquid crystal displays (LCDs), plasma display panels (PDPs), and electroluminescence (EL) displays are required to have various functions, such as protection from damages, prevention of outdoor-light reflection, and protection from stains, on their surfaces.

One means of imparting a function of preventing outdoor-light reflection is a low reflection (LR) treatment wherein a material whose refractive index is different from that of a display component is applied onto the display surface, and thereby light reflection is suppressed owing to the interference effect between the light reflected on the display surface and the light reflected on the coating surface.

In general, however, the reflectivities are different between the reflection at the interface between the air and the coating surface and the reflection at the interface between the coating surface and the display surface. Thus, these reflected light beams are not perfectly removed and the reflection preventing effect is insufficient. As a result, only performing the LR treatment causes reflection of surrounding light at a certain reflectivity, so that images of a light source such as a fluorescent light appear on the display and cause hard-to-see display. In order to prevent such problems, the following technique is proposed; that is, an antiglare (AG) treatment, in which a fine uneven pattern is formed on the display surface to suppress outdoor-light reflection by taking advantage of the light-scattering effect, is further performed on the surface, so that light is scattered and images of a light source such as a fluorescent light is faded out. The treatment combining the LR treatment and the AG treatment mentioned here is also referred to as an AGLR treatment.

In addition to the method in which a fine uneven pattern is formed on the display surface, examples of the light-scattering method include: a method in which an antiglare layer with particles for light scattering, such as silica, dispersed thereon is formed on a polarizer of a liquid crystal display device (for example, see Patent Document 1); a method in which a black mesh using carbon, for example, is formed on the surface of a display device (for example, see Patent Document 2); a method in which a solidified phase keeping a droplet shape is formed on a glass substrate and another different phase is formed on the solidified phase utilizing the sol-gel process to form a projecting film (for example, see Patent Document 3); and a method in which an uneven structure is formed by polymer phase separation, and thereby an antiglare film is formed which has a surface regularity causing part of transmission light to show grid-like diffraction (for example, see Patent Document 4).

As a method for achieving low reflection on the display surface other than the AGLR treatment, a moth-eye (moth's eye) structure is recently being focused on because it can achieve an effect of greatly preventing reflection without light diffraction. The moth-eye structure provides an uneven pattern finer than the pattern by the AG treatment on the surface of an article which is a target of an antireflection treatment. The uneven pattern has projections and depressions each arranged at an interval of not longer than light wavelength (for example, 400 nm or shorter) without any space. Thereby, the structure makes the change in refractive index at the interface between the outside (air) and the film surface apparently continuous, so that the structure allows almost all light beams to pass through regardless of the refractive index interface and most of light reflection on the article surface is cancelled (for example, see Patent Documents 5 and 6).

Patent Document 1: JP 11-281818 A
Patent Document 2: JP 3-196451 A
Patent Document 3: JP 2003-84106 A
Patent Document 4: JP 2007-187746 A
Patent Document 5: JP 2001-517319 T
Patent Document 6: JP 2003-531962 T

SUMMARY OF THE INVENTION

As shown in Patent Document 1, for example, a conventional AG-LR film achieves an antiglare effect by having a gentle uneven shape on the film surface and suppresses display glare by having fine beads which serve as particles for light scattering thereon.

A moth-eye film can be used instead of an AG-LR film; in such a case, the film may have the following structure. FIG. 35 is a schematic cross-sectional view of a liquid crystal display device comprising a moth-eye film with fine beads blended therein.

As shown in FIG. 35, one example of the liquid crystal display device has a structure that a backlight 101, an array substrate 111 for driving/controlling liquid crystal display at each pixel, a liquid crystal layer 131, a color filter substrate 121 for color-image display, and an antireflection film 141 which suppresses outdoor-light reflection, are stacked in this order from the inside (back side) of the liquid crystal display device.

The array substrate 111 has a glass substrate 112. A transparent electrode 113 made of indium tin oxide (ITO) and the like components are provided on the liquid crystal layer 131 side of the glass substrate 112. The color filter substrate 121 has a glass substrate 122, and is provided with a color filter layer 123 (123R, 123G, 123B) assuming red, green, and blue colors, a transparent electrode 124 made of ITO, and the like components from the glass substrate 122 side to the liquid crystal layer 131 side. In addition, the color filter substrate 121 has an adhesive layer 125, a retardation film 126, a polarizer film 127 including a polyvinyl alcohol (PVA) film 127a and a triacetyl cellulose (TAC) film 127b stacked, and the like from the glass substrate 122 side to the outside (viewing side).

The antireflection film 141 is disposed on the outer portion of the color filter substrate 121, in other words, on the TAC film 127b. The antireflection film 141 contains fine beads 142 therein, and has a gentle uneven structure on its surface. Light incident from the outside into the liquid crystal display device is scattered by the uneven structure formed on the surface of the antireflection film 141. As a result, the antiglare effect is achieved against the reflected light. Further, light incident from the inside of the device, that is, light emitted by the backlight 101, passes through the liquid crystal layer 131 and the like layers and then scattered by the fine beads 142 in the antireflection film 141. As a result, the effect of suppressing glare is achieved against transmitted light. In the case that the size of each projection/depression formed on the surface is substantially the same as the size of the pixel (for example, 50% to 200%), glare is most conspicuous. In other words, this is as if each pixel is provided with a lens and each lens refracts a light beam in a different direction. Thus, one pixel is brighter and another is darker even though a single-color image is viewed from a certain direction. This phenomenon is recognized as glare. This problem can be avoided if each projection/depression on the surface is formed in a size sufficiently smaller than the pixel size. Disadvantageously, however, no technique has been developed for mass-producing such projections and depressions on the surface. Therefore, assistant by the fine beads 142 is required.

On the other hand, the inventors found that stamping for printing a moth-eye shape on a resin layer to be shaped containing fine beads may cause some structural defects. FIGS. 36 and 37 each are a schematic view showing a step of forming a moth-eye film containing fine beads. FIG. 36 shows a light irradiation step, and FIG. 37 shows a mold-releasing step. The moth-eye film is formed as follows. That is, a resin layer to be shaped 151, which serves as a base of the moth-eye film, is formed on a substrate 161; a mold 152 having an uneven structure is pressed to the surface of the resin layer; light (indicated by a solid white arrow) is applied to the resin layer to be shaped 151 while the mold 152 is pressed thereto, so that the resin layer to be shaped 151 is cured; finally, the mold 152 is removed, and thereby a moth-eye film is formed. As shown in FIG. 36, however, the fine beads 142 are caught between projections of the mold 152 for printing the moth-eye shape if the resin layer to be shaped 151 contains the fine beads 142, so that a printing plate is clogged. Then, as shown in FIG. 37, the surface of the fine beads 142 may be exposed and the resin layer on the fine beads 142 may be peeled off when the mold is released.

In order to avoid plate clogging, a middle layer containing fine beads may be additionally formed between the resin layer to be shaped and the TAC film; however, formation of a film which serves as a base of the middle layer requires much effort and an excessive cost. Therefore, a new technique is demanded which easily suppresses glare without fine beads.

The present invention is made under such situation, and an object of the present invention is to provide an antireflection film which has low reflectivity and suppresses glare.

The present inventors have studied various techniques for performing an antiglare treatment on the surface of a display device comprising a moth-eye film that has ultra-low reflectivity, and they have focused on the tip portions of the respective projections of the moth-eye film. Then, the inventors have found that a sticking phenomenon occurs, that is, the tip portions of the projections of the moth-eye film adhere to each other, when the moth-eye film is formed under certain conditions. Further, they have found that each group (hereinafter, also referred to as sticking structure) formed by the sticking phenomenon has a characteristic of scattering incident light. The inventors have furthermore found that appropriate adjustment of the size of each sticking structure can suppress glare without reducing display quality. As a result, the inventors have arrived at the fact that the above problems can be overcome and have completed the present invention.

In other words, the present invention relates to an antireflection film comprising a surface that comprises a moth-eye structure comprising multiple projections, wherein apexes of any two adjacent projections are apart from each other by a distance not longer than a wavelength of visible light; the moth-eye structure comprises sticking structures each of which includes projections with tip portions of the projections adhering to each other; each of the sticking structures is 0.05 µm or greater and smaller than 1 µm in diameter; and a density of the number of sticking structures relative to a planar area of the antireflection film is 0.01 units/µm$^2$ or more and less than 20 units/µm$^2$.

The antireflection film of the present invention has multiple projections (a moth-eye structure) on its surface with the apexes of any two adjacent projections being apart from each other by a distance not longer than the wavelength of visible light. The phrase "not longer than the wavelength of visible light" herein means a length of not longer than 400 nm, which is the lower limit of a common wavelength range of visible light. The length is more preferably not longer than 300 nm, and further preferably not longer than 200 nm, which is half of the visible light wavelength. If the distance is longer than 200 nm, the wavelength of 700 nm, which corresponds to red, may show its color; however, this influence is sufficiently suppressed if the distance is not longer than 300 nm, and the influence is substantially perfectly prevented if the distance is not longer than 200 nm.

The antireflection film has sticking structures each formed by the tip portions of the projections adhering to each other. The sticking structures enable to scatter both the light incident from the outside into the antireflection film and the light incident from the substrate side. The number of projections constituting each sticking structure is not particularly limited; for example, 2 to 5 projections may form one sticking structure. The sticking structure may be one in which the whole of a projection is integrated with the whole of another projection, or may be one in which the tip portions of the projections adhere to each other and the inside is hollow, for example.

The diameter of each sticking structure is 0.05 µm or greater and smaller than 1 µm. Sticking structures each having a diameter of 0.05 µm or greater show a sufficient characteristic of scattering light. In contrast, if each sticking structure has a diameter of 1 µm or greater, the display contrast ratio may be reduced in the case of applying the antireflection film of the present invention to a display device, for example. The phrase "the diameter of each sticking structure" in the present invention means the width of the longest portion of each sticking structure when the surface of the antireflection film is planarly observed. Examples of the shape of the sticking structure when the surface of the antireflection film is planarly observed include a circular shape, ellipse shape, polygonal shape, star shape, flower shape, and indeterminate shape. If the projections each have a similar structure, they tend to show a star shape, gourd shape, flower shape, or indeterminate shape.

The density of the number of sticking structures relative to a planar area of the antireflection film is 0.01 units/δm$^2$ or more and less than 20 units/µm$^2$. Light can be scattered if the number of the sticking structures is 0.01 or more per square micrometer. In contrast, if the number of the sticking structures is 20 or more per square micrometer, the display contrast ratio may be reduced in the case of applying the antireflection film of the present invention to a display device, for example. The density of the number of sticking structures relative to a planar area of the antireflection film is preferably 1.3 units/µm$^2$ or more, and more preferably 4.0 units/µm$^2$ or more.

The configuration of the antireflection film of the present invention is not especially limited as long as it essentially includes such components.

Each of the projections preferably has an aspect ratio of 0.8 or greater, and more preferably 1.0 or greater. The term "aspect ratio" herein means a ratio of the height to the base length of each projection. In other words, the value obtained by dividing the height by the base length (height/base length) is the aspect ratio. As each projection has an aspect ratio greater than a certain value, the tip portions of the projections tend to be easily folded and the sticking structures tend to be easily formed.

In the case of applying the antireflection film of the present invention to a display device whose display screen has multiple pixels, the display device preferably includes pixels each having a short diameter of 250 µm or shorter. In other words, the present invention also relates to a display device comprising the aforementioned antireflection film and multiple pixels, wherein the pixels each have a substantially rectangular shape with short sides and long sides, and the short sides each are 250 µm or shorter in length. The term "substantially rectangular shape" herein means a shape having substantially recognizable short sides and long sides, and the term includes a rectangular shape partially having a planarly protruding portion and a shape partially having a cut-out portion. As the distance between the projections of the moth-eye film and the short diameter (length of short side) of each pixel is closer, glare is more likely to occur. If the short diameter of a pixel is 250 µm and the distance between the projections of the moth-eye film is 50 µm, for example, glare is likely to occur. In contrast, glare is greatly suppressed if the diameter and the number density of each sticking structure are adjusted. Therefore, according to the display device of the present invention, such a problem unique to the moth-eye film can be easily solved only by adjusting the conditions such as a size of the sticking structure on the moth-eye film. The term "pixel" herein means an area surrounded by one pixel electrode.

The following will describe in detail the method of the present invention suitable for producing the antireflection film of the present invention.

The present invention also relates to a method for producing an antireflection film which comprises a surface that comprises a moth-eye structure comprising multiple projections wherein apexes of any two adjacent projections are apart from each other by a distance not longer than a wavelength of visible light. The method comprises the steps of: applying a resin onto a substrate to form a film; and pushing a mold comprising a surface with multiple depressions to a surface of the film and simultaneously curing the film to form multiple projections on the surface of the film, wherein the depressions of the mold each have an aspect ratio of 1.6 or greater (hereinafter, also referred to as the first production method of the present invention). More preferably, the aspect ratio of each of the depressions of the mold is 2.0 or greater.

The depressions of the mold each having a size in the aforementioned range enable to produce a moth-eye film having projections whose tip portions are easily folded, so that the sticking structures can be easily formed. The term "mold" herein means one having rigidity to the extent enough to form a moth-eye film, and it is not necessarily limited to metal-made one. Examples of the curing method include photo-curing and thermosetting.

The present invention also relates to a method for producing an antireflection film which comprises a surface that comprises a moth-eye structure comprising multiple projections wherein apexes of any two adjacent projections are apart from each other by a distance not longer than a wavelength of visible light. The method comprises the steps of: applying a resin onto a substrate to form a film; and pushing a mold comprising a surface with multiple depressions to a surface of the film and simultaneously half-curing the film to form multiple projections on the surface of the film (hereinafter, also referred to as the second production method of the present invention).

The term "half-curing" herein means a curing process on a curable material to the extent that the material is not perfectly cured. The projections formed by half-curing have tip portions which are easily folded, so that the sticking structures can be easily formed. Further, in the present production method, the degree of half-curing can be adjusted by adjusting the curing conditions and curing time period, for example. Thus, it is easy to control the process so as not to form too many sticking structures.

The present invention also relates to a method for producing an antireflection film which comprises a surface that comprises a moth-eye structure comprising multiple projections wherein apexes of any two adjacent projections are apart from each other by a distance not longer than a wavelength of visible light. The method comprises the steps of: applying a resin onto a substrate to form a film; pushing a mold comprising a surface with multiple depressions to a surface of the film and simultaneously curing the film to form multiple projections on the surface of the film; and wet-wiping the surface of the film (hereinafter, also referred to as the third production method of the present invention).

Wet-wiping on the cured film surface softens the tip portions of the projections, so that the tip portions of the projections adhere to each other due to the surface tension of water when water dries. In addition, the pressure upon wiping bends the tip portions, so that the sticking structures are easily formed. Further, in the present production method, the pressure upon wiping and the amount of water can be adjusted, for example. Thus, it is easy to control the process so as not to form sticking structures.

The production method preferably further comprises the step of dry-wiping the film surface after the wet-wiping of the film surface. The dry-wiping after the wet-wiping enables to reduce the number of sticking structures excessively formed by the wet-wiping. In other words, combination of wet-wiping and dry-wiping makes it easier to adjust the number of sticking structures.

Effects of the Invention

In the antireflection film of the present invention, the moth-eye structure itself of the antireflection film is improved to have an antiglare effect. Thus, the present antireflection film can easily achieve a low reflection effect and an antiglare effect without quality deterioration.

BRIEF DESCRIPTION OF THE DRAWINGS

FIG. 35 is a schematic cross-sectional view of the liquid crystal display device comprising a moth-eye film with fine beads mixed therein.

MODES FOR CARRYING OUT THE INVENTION

Figure 1:
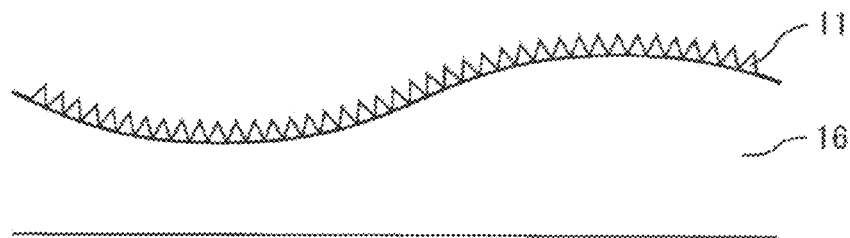
FIG. 1 is an overall schematic cross-sectional view of the moth-eye film of Embodiment 1.

The present invention will be mentioned in more detail referring to the drawings in the following embodiments, but is not limited to these embodiments.

Embodiment 1

Figure 2:
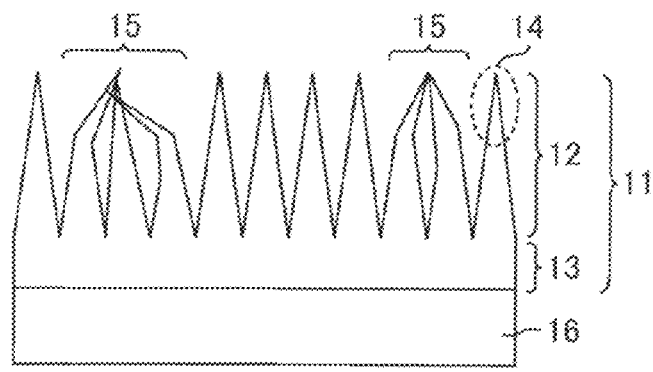
FIG. 2 is an enlarged schematic cross-sectional view of the moth-eye film of Embodiment 1.

FIGS. 1 and 2 each are a schematic cross-sectional view of the moth-eye film (antireflection film) of Embodiment 1. FIG. 1 is an overall view and FIG. 2 is an enlarged view. As shown in FIGS. 1 and 2, a moth-eye film 11 of Embodiment 1 is disposed on a substrate 16 which is the target of antireflection treatment. The substrate 16 to be the target of antireflection treatment may be a member constituting the outermost surface of a display device, such as a polarizer, acryl protecting plate, or hard coat layer disposed on the surface of a polarizer.

As shown in FIG. 1, the moth-eye film 11 has a structure that multiple fine projections are arranged on its surface. Each of the projections is tapered toward the tip. The surface of the substrate 16 has an uneven structure with a gentler incline than the fine projections, and the surface of the moth-eye film 11 also has a corresponding gentle uneven structure. The surface of the substrate 16 is formed by the AG treatment. The distance between the apexes of the projections constituting the uneven structure is much greater than the wavelength of visible light, and it is, for example, 5 to 50 μm. Such a double layer structure gives an antireflection effect and an antiglare effect at the same time. In Embodiment 1, the AG treatment is not necessarily performed.

As shown in FIG. 2, the moth-eye film 11 has a moth-eye structure on its surface, that is, a structure in which multiple projections 12 are arranged on its surface in a manner that the distance between the apexes of any two adjacent projections 12 is not longer than the wavelength of visible light. The moth-eye film 11 comprises such projections 12 and a base portion 13 below the projections 12 (on the substrate side). The distance between the apexes of any two adjacent projections 12 is not longer than the wavelength of visible light; in other words, the surface of the moth-eye film 11 is provided with the multiple projections 12 as repeating units at a cycle of not longer than the wavelength of visible light.

In the moth-eye film of Embodiment 1, tip portions 14 of some projections 12 constituting the surface are folded, and the tip portions of the projections 12 adhere to each other to form sticking structures (bundle structures) 15. FIG. 2 shows the structure in which two or three tip portions 14 adhere to each other as one example; however, the number of projections 12 constituting one sticking structure 15 is not particularly limited.

The following will describe the method for producing the moth-eye film 11 of Embodiment 1 with reference to Examples 1 to 4 and Reference Example 1 wherein a moth-eye film was actually produced.

First, a 10-cm-square glass substrate was prepared, and aluminum (Al) as a mold material was deposited on the glass substrate at a thickness of 1.0 μm by sputtering. Then, the aluminum was anodically oxidized and was etched immediately thereafter. These steps are repeated to form an anodic oxidation layer having a large number of fine depressions, wherein the distance between the bottom points of any two adjacent holes is not longer than the wavelength of visible light. Specifically, the mold was formed by the flow comprising anodic oxidation, etching, anodic oxidation, etching, anodic oxidation, etching, anodic oxidation, etching, and anodic oxidation in this order (5 times of anodic oxidation and 4 times of etching). Such a process of repeating anodic oxidation and etching provides fine depressions with a tapered shape toward the inside of the mold.

The anodic oxidation conditions were 0.6 wt % of oxalic acid, liquid temperature of 5° C., and an applied voltage of 80 V. The anodic oxidation duration was different in each example. Variations in the anodic oxidation duration cause variations in the size of depressions formed. The relationship between the anodic oxidation duration and the size of depressions (mold height) will be described in detail referring to the following Table 1. The etching conditions were 1 mol/l of phosphoric acid, liquid temperature of 30° C., and 25 minutes in the respective examples.

A 2P (photo-polymerization) resin solution was dropwise added onto the surface of each of the molds having different mold heights produced through the above production process. A TAC film was carefully attached onto each 2P resin layer made from the 2P resin solution while paying attention to avoid locking of air bubbles therebetween. Then, 2 J/cm² of ultraviolet (UV) rays were applied to the 2P resin layer to cure the 2P resin layer, and a lamination film of the 2P resin film and the TAC film obtained by the curing was peeled off from the mold.

Finally, each laminated film consisting of the 2P resin film, which is to be a moth-eye film, and the TAC film was attached onto a transparent acryl plate. Thereby, samples of the respective examples were completed.

The completed samples and molds were measured for the depth of the projections and depressions using a scanning electron microscope (SEM). Further, the structure of sticking was observed using the SEM.

Table 1 shows the values of the anodic oxidation duration, depression size of the mold, and projection height of the moth-eye film (printed product) onto which the uneven structure of the mold was printed, in the respective examples and the reference example.

TABLE 1

| | Anodic oxidation duration (sec.) | Depression height (nm) | Printed product height (nm) | Printing ratio | Aspect ratio |
|---|---|---|---|---|---|
| Reference Example | 15 | 231 | 143 | 0.62 | 0.72 |
| Example 1 | 20 | 328 | 175 | 0.53 | 0.88 |
| Example 2 | 24 | 387 | 219 | 0.57 | 1.10 |
| Example 3 | 33 | 520 | 255 | 0.49 | 1.28 |
| Example 4 | 38 | 600 | 373 | 0.62 | 1.87 |

Figure 3:
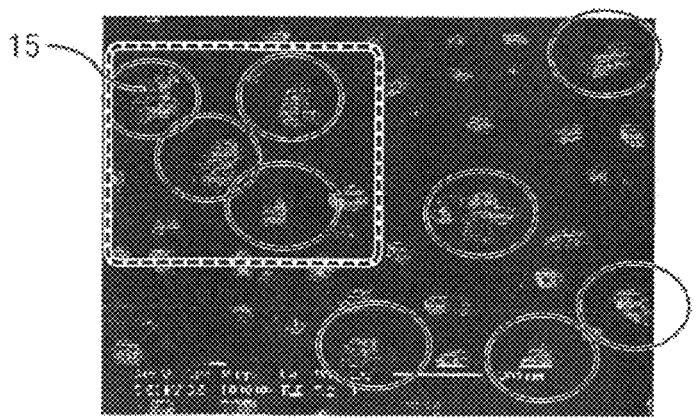
FIG. 3 is a plan photograph of the moth-eye film produced in Example 1.
Figure 4:
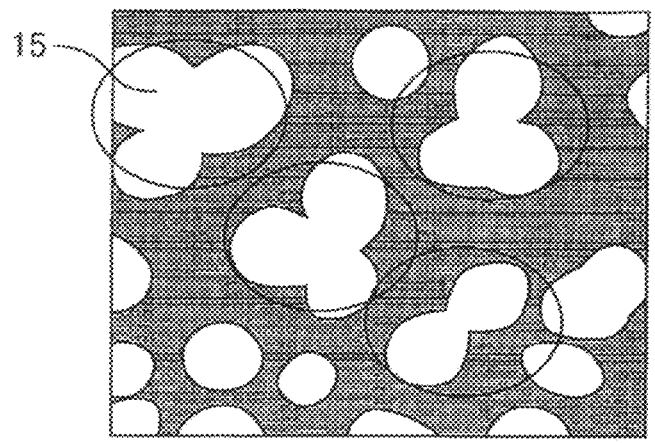
FIG. 4 is a schematic view of the portion outlined by the dotted line in FIG. 3.

FIG. 3 is a plan photograph of the moth-eye film produced in Example 1, and FIG. 4 is a schematic view of the portion outlined by the dotted line in FIG. 3. The circled portions indicate the sticking structures 15 formed by bonding of the tip portions of the projections. The white portions shown in FIG. 3 are the projections of the moth-eye film. When the moth-eye film is planarly observed, many of the projections have a circular shape or an ellipse shape. In contrast, portions where the sticking structure 15 is formed each have a radially expanding star shape, a flower or gourd shape formed by multiple overlapping circles or ellipses, or an indeterminate form without regularity. The sticking structures of the present invention each are 0.05 μm or greater and not greater than 1 μm in diameter. The plan photograph of FIG. 3 shows the area of 917 nm long and 1257 nm broad, while the sticking structures each are 150 to 250 nm in diameter. Thus, the respective sticking structures are within the scope of the present invention.

Figure 5:
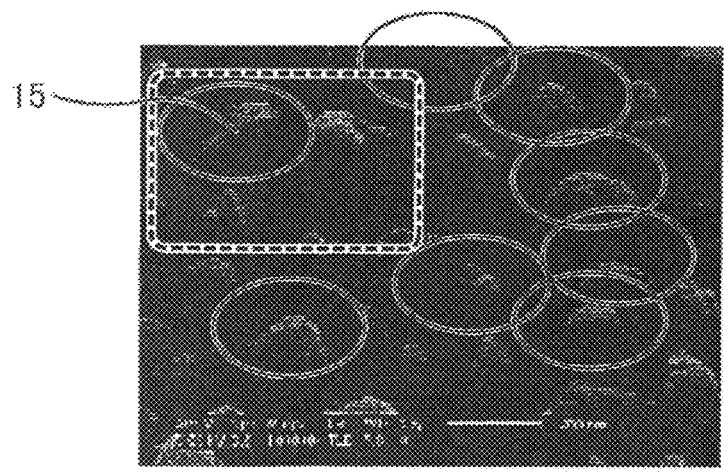
FIG. 5 is a perspective photograph of the moth-eye film produced in Example 1.
Figure 6:
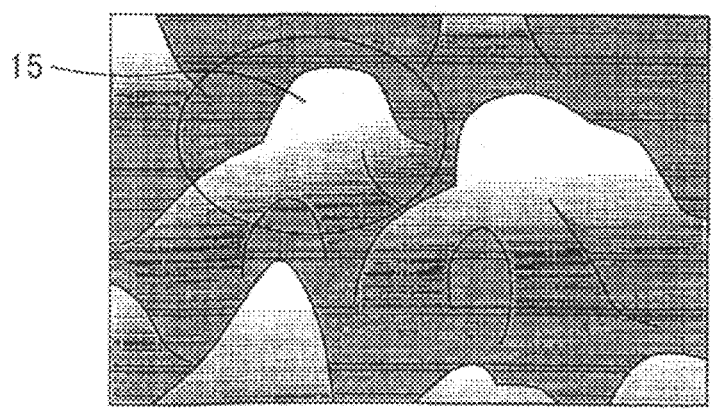
FIG. 6 is a schematic view of the portion outlined by the dotted line in FIG. 5.

FIG. 5 is a perspective photograph of the moth-eye film produced in Example 1, and FIG. 6 is a schematic view of the portion outlined by the dotted line in FIG. 5. The circled portions indicate the sticking structures 15 formed by bonding of the tip portions of the projections. Each of the sticking structures 15 has a structure that the whole of adjacent projections are integrated with each other or a structure that the tip portions thereof adhere to each other and the inside thereof is hollow. In Embodiment 1, each projection is apart from another by about 180 nm, the projections each are about 200 nm height, and each projection 12 has an aspect ratio of 0.9.

These sticking structures 15 serve as scattering factors for scattering the incident light into the moth-eye film 11. The light amount scattered by the scattering factors (scattered light amount) depends on the size of each sticking structure 15 and the number of the sticking structures 15 per unit area (number density).

Figure 7:
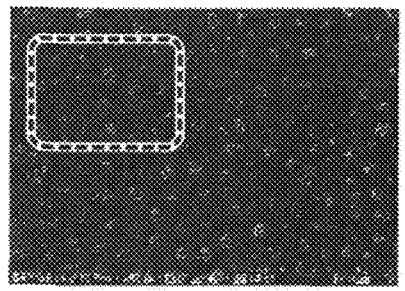
FIG. 7 is a plan photograph of the moth-eye film produced in Reference Example.
Figure 8:
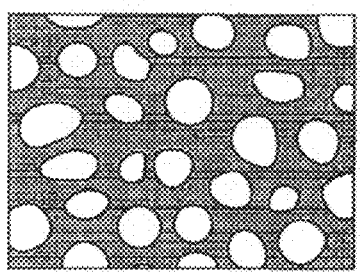
FIG. 8 is a schematic view of the portion outlined by the dotted line in FIG. 7.
Figure 9:
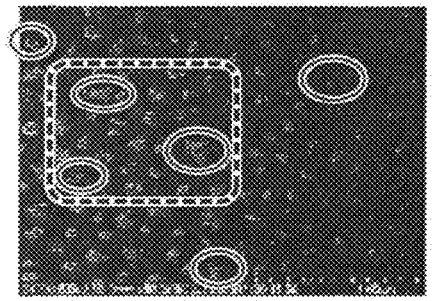
FIG. 9 is a plan photograph of the moth-eye film produced in Example 1.
Figure 10:
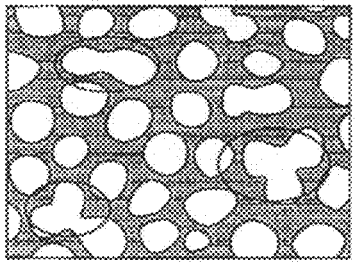
FIG. 10 is a schematic view of the portion outlined by the dotted line in FIG. 9.
Figure 11:
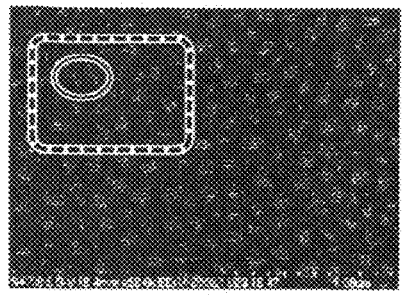
FIG. 11 is a plan photograph of the moth-eye film produced in Example 2.
Figure 12:
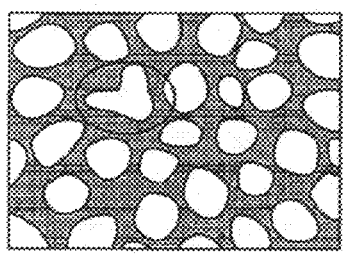
FIG. 12 is a schematic view of the portion outlined by the dotted line in FIG. 11.
Figure 13:
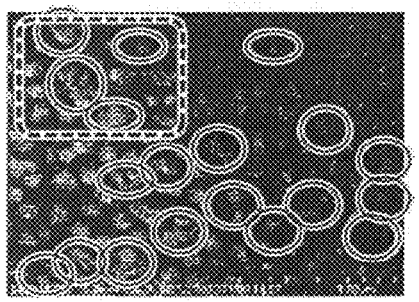
FIG. 13 is a plan photograph of the moth-eye film produced in Example 3.
Figure 14:
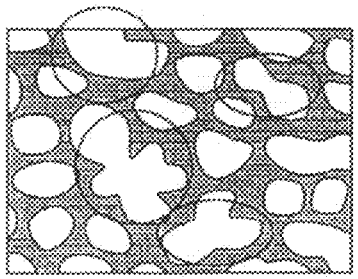
FIG. 14 is a schematic view of the portion outlined by the dotted line in FIG. 13.
Figure 15:
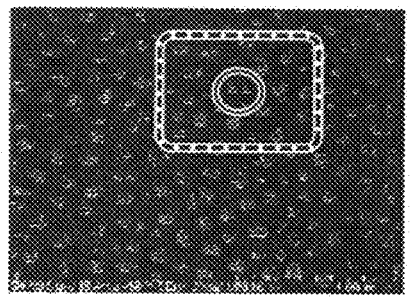
FIG. 15 is a plan photograph of the moth-eye film produced in Example 4.
Figure 16:
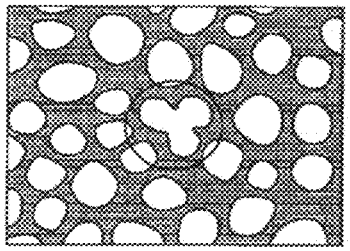
FIG. 16 is a schematic view of the portion outlined by the dotted line in FIG. 15.

FIGS. 7 to 16 are plan photographs each showing the moth-eye film produced in any one of Examples 1 to 4 and Reference Example and schematic views each showing the portion outlined by the dotted line in the corresponding photograph. These pictures are enlarged at the same magnification. In Examples 1 to 4 and Reference Example, the films are produced by the same production method but they are produced under different production conditions. FIGS. 7 and 8 show Reference Example, FIGS. 9 and 10 show Example 1, FIGS. 11 and 12 show Example 2, FIGS. 13 and 14 show Example 3, and FIGS. 15 and 16 show Example 4. The circled portions indicate the sticking structures formed by bonding of the tip portions of the projections. The sticking structures shown in FIGS. 7 to 16 each have a diameter of 300 to 600 nm. In FIGS. 7 and 8 showing Reference Example, no sticking structure is formed; in contrast, in FIGS. 9 to 16 showing Examples 1 to 4, sticking structures are formed in each example.

Table 2 shows the number of projections included in the respective photographs and the number density per square micrometer in the respective examples of Embodiment 1.

TABLE 2

| | Number | Number density (pcs/μm²) |
|---|---|---|
| Reference Example | 0 | 0.0 |
| Example 1 | 1 | 0.2 |
| Example 2 | 1 | 0.2 |
| Example 3 | 6 | 1.3 |
| Example 4 | 19 | 4.0 |

Figure 17:
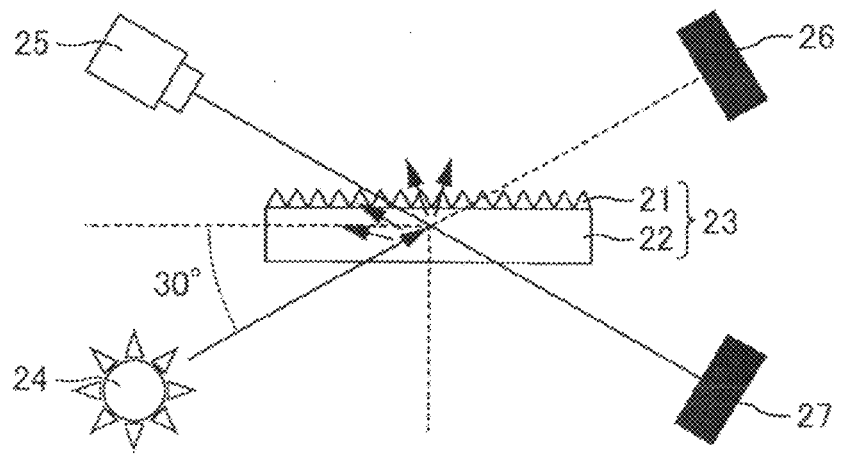
FIG. 17 is a schematic view of the measurement system used for measuring the scattered light amount.

Further, in order to measure the scattered light amount of the incident light into each sample of the moth-eye film, a measurement system was prepared. FIG. 17 is a schematic view of the measurement system used for measuring the scattered light amount.

As shown in FIG. 17, a test object 23 is a laminate comprising a transparent acryl board (substrate) 22 and the moth-eye film 21 which is disposed on the transparent acryl board 22 and which is produced in any one of the examples or the reference example. In the measurement, a light source 24 is placed on the backside of the moth-eye film 21 (the side where neither projection nor depression are formed) and in the direction forming an angle of 30° with the main surface of the moth-eye film 21, and light is applied from the backside of the moth-eye film 21. Further, an absorber 26 is placed at the position on the line indicating the straightforward movement of light and opposite to the light source across the moth-eye film, and a black absorber 27 is placed at the position symmetrically opposite to the light source about the normal line toward the main surface of the moth-eye film 21. Of these two absorbers, the absorber 26, which is at the position on the line indicating the straightforward movement of light and opposite to the light source across the moth-eye film, absorbs the light beams (transmitted light) passing through the moth-eye film without any change among the incident light beams into the moth-eye film 21. Furthermore, the absorber 27, which is at the position symmetrically opposite to the light source about the normal line toward the main surface of the moth-eye film 21, absorbs the light beams (specular reflection light) specularly reflected due to the structure of the moth-eye film among the incident light beams into the moth-eye film.

A luminance meter (trade name: SR-UL1, Topcon Technohouse Corp.) is placed at the position symmetrically opposite to the light source about the main surface of the moth-eye film. Since the absorber 26 absorbs the transmitted light and the absorber 27 absorbs the specular reflection light, such a measurement system enables to measure the amount of light scattered (scattered light amount) due to the structure of the moth-eye film 21.

Figure 18:
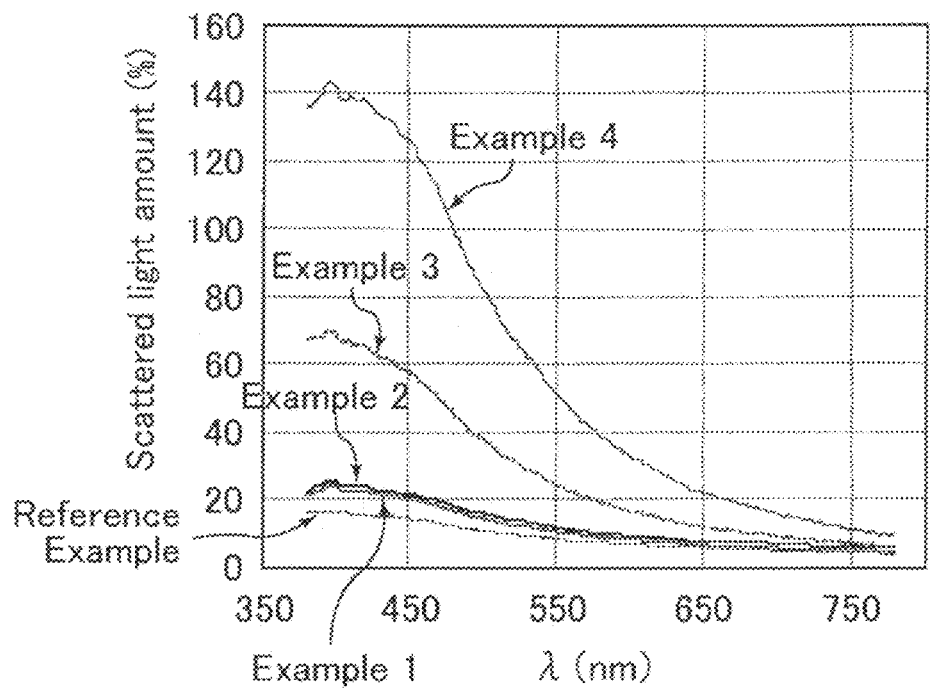
FIG. 18 is a graph showing the measurement results of the scattered light amount.

FIG. 18 is a graph showing the results of measuring the scattered light amount. In FIG. 18, values along the vertical axis (scattered light amount) mean the ratio (%) of the scattered light amount increased due to the moth-eye film. The respective values of the scattered light amount are normalized by the transparent acryl board. In other words, the scattered light amount along the vertical axis in FIG. 18 indicates the ratio of radiance of light scattered on the sample surface with the moth-eye film to the radiance of light scattered on the sample surface without the moth-eye film. The transverse axis in FIG. 18 indicates the wavelength of scattered light. The curve with the lowest scattered light amount is of Reference Example, and the scattered light amount becomes greater from Example 1 to Example 2, Example 3, and Example 4. As is evident from FIG. 18, the scattering state of light more greatly changes at a shorter wavelength side.

The measurement result of Reference Example in FIG. 18 shows that the light scattering effect is hardly achieved in the case that no sticking structure within the scope of the present invention exists; while the measurement results of Examples 1 and 2 show that even a few sticking structures provide the light scattering effect. In addition, the results are largely different between Examples 2 and 3; thus, if the sticking structures have a number density of 1.3 pcs/cm$^2$ or greater, a good scattering effect can be achieved. Furthermore, the results are more largely different between Examples 3 and 4; thus, a much better scattering effect can be achieved if the number density is 4.0 pcs/cm$^2$ or greater.

Embodiment 2

The moth-eye film of Embodiment 2 is different from the moth-eye film of Embodiment 1 in that the material resin of the moth-eye film is different; however, the film of Embodiment 2 is the same as that of Embodiment 1 in the other respects. The following will describe the method for producing the moth-eye film of Embodiment 2 referring to Examples 5 and 6 wherein a moth-eye film was actually produced.

Figure 19:
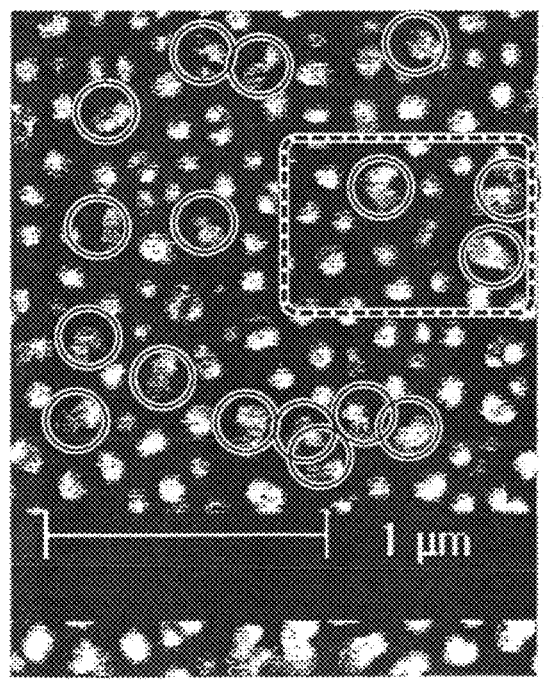
FIG. 19 is a plan photograph of the moth-eye film produced in Example 5.
Figure 20:
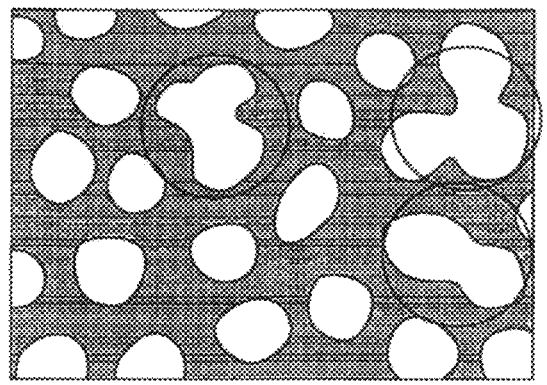
FIG. 20 is a schematic view of the portion outlined by the dotted line in FIG. 19.
Figure 21:
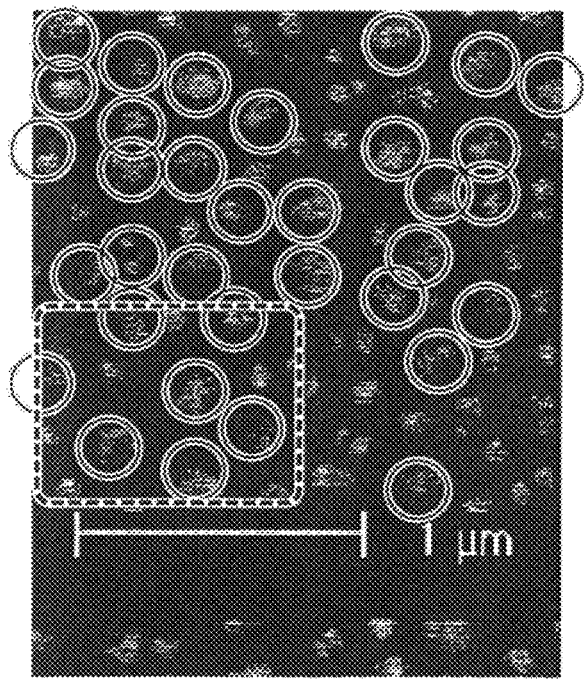
FIG. 21 is a plan photograph of the moth-eye film produced in Example 6.
Figure 22:
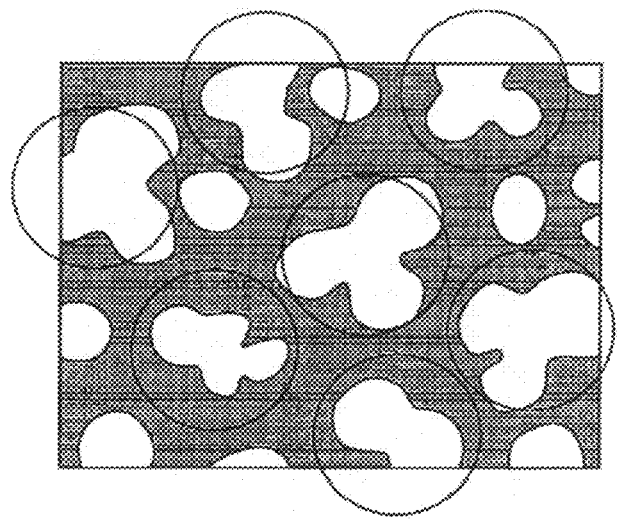
FIG. 22 is a schematic view of the portion outlined by the dotted line in FIG. 21.

FIG. 19 is a plan photograph of the moth-eye film produced in Example 5 and FIG. 20 is a schematic view of the portion outlined by the dotted line in FIG. 19. In addition, FIG. 21 is a plan photograph of the moth-eye film produced in Example 6 and FIG. 22 is a schematic view of the portion outlined by the dotted line in FIG. 21. The steps in Examples 5 and 6 are substantially the same as those in Example 2, but they are different from those in Example 2 in that a resin material is not one to be cured at 2 J/cm$^2$ but one to be cured at 6 J/cm$^2$. The moth-eye film produced in Example 5 is a moth-eye film formed by applying 6 J/cm$^2$ of ultraviolet rays to such a resin material. The moth-eye film produced in Example 6 is a moth-eye film formed by applying 2 J/cm$^2$ of ultraviolet rays to such a resin material.

Table 3 shows the number of projections included in the photograph and the number density per square micrometer in the respective examples of Embodiment 2.

TABLE 3

|  | Number | Number density (pcs/µm$^2$) |
|---|---|---|
| Example 5 | 17 | 4.9 |
| Example 6 | 34 | 9.8 |

As is evident from the comparison between Examples 5 and 6, the number of sticking structures can be increased by reducing the applied light amount. This is because deformation of projections tends to occur if the degree of curing is low (in a half-cured state); the deformation of projections is likely to cause formation of sticking structures.

Embodiment 3

The moth-eye film of Embodiment 3 is different from the moth-eye films of Embodiments 1 and 2 in that the surface of the moth-eye film is wet-wiped after applying ultraviolet rays to the resin layer to cure the layer; however, the film is the same as those in Embodiments 1 and 2 in the other respects. The following will describe the method for producing the moth-eye film of Embodiment 3 referring to Example 7 wherein a moth-eye film is actually produced.

Figure 23:
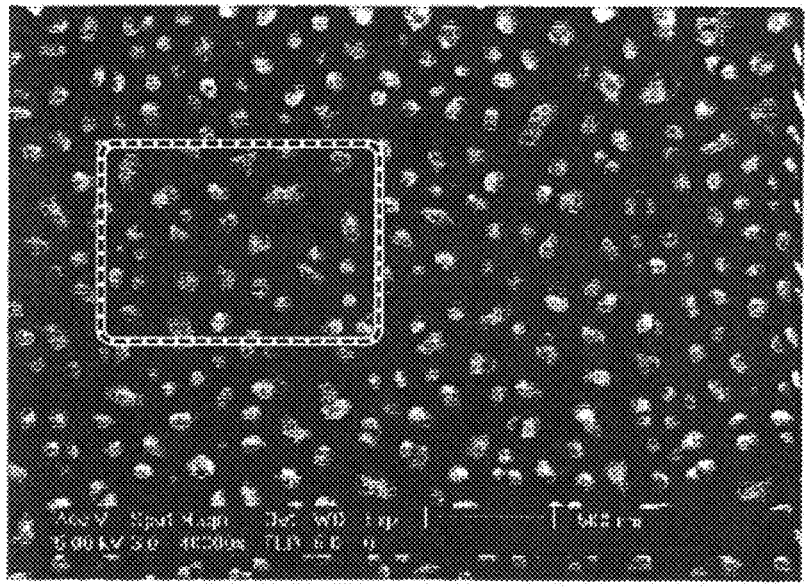
FIG. 23 is a plan photograph of the moth-eye film produced in Example 7 before wet-wiping.
Figure 24:
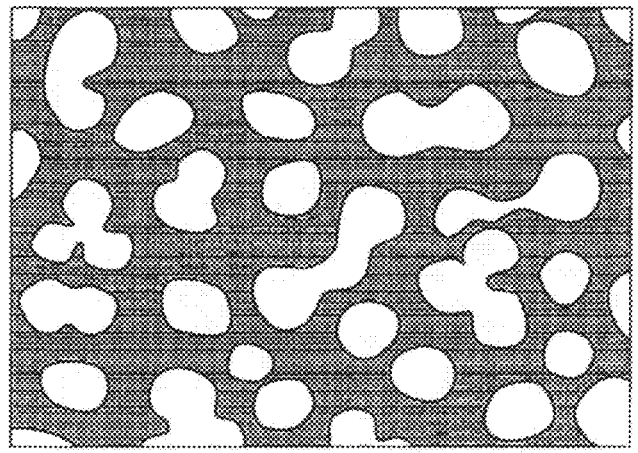
FIG. 24 is a schematic view of the portion outlined by the dotted line in FIG. 23.
Figure 25:
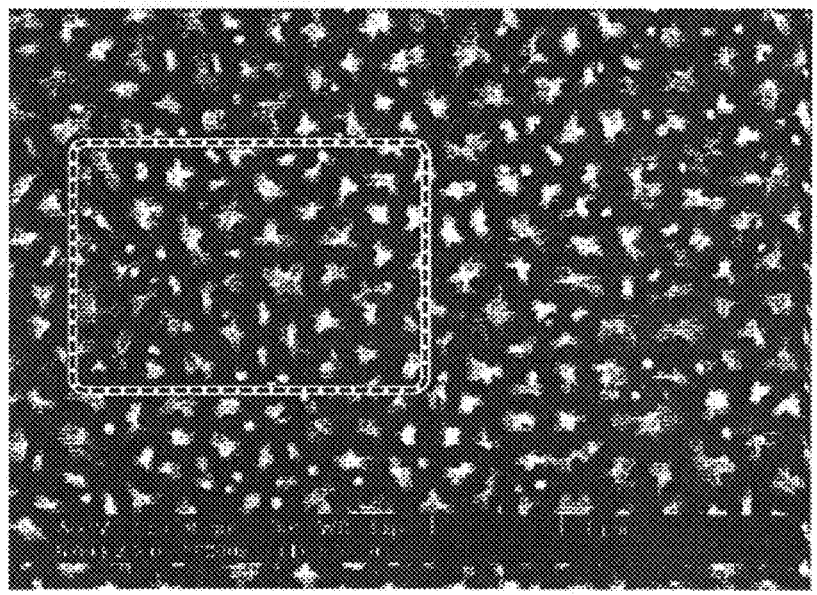
FIG. 25 is a non-enlarged plan photograph of the moth-eye film produced in Example 7 after wet-wiping.
Figure 26:
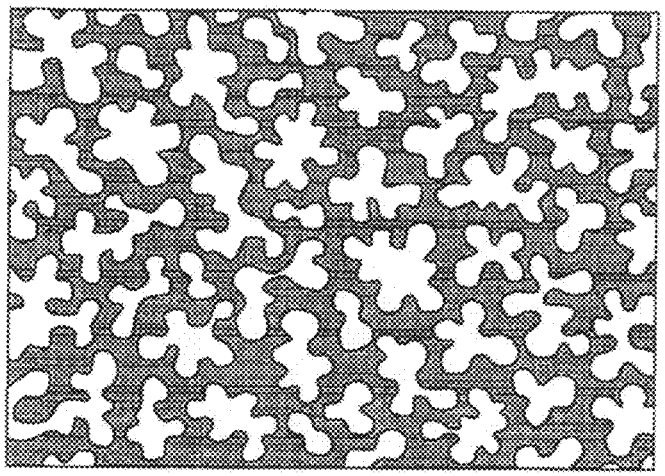
FIG. 26 is a schematic view of the portion outlined by the dotted line in FIG. 25.
Figure 27:
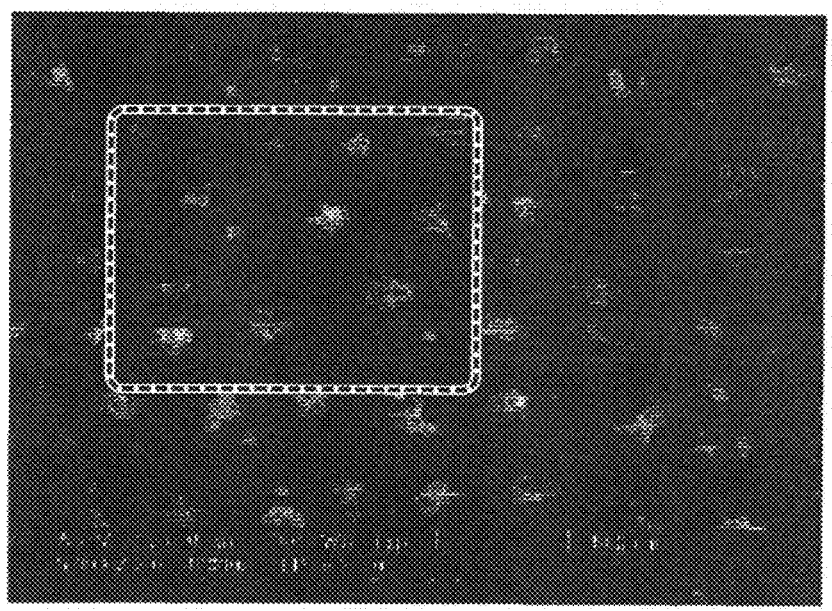
FIG. 27 is an enlarged plan photograph of the moth-eye film produced in Example 7 after wet-wiping.
Figure 28:
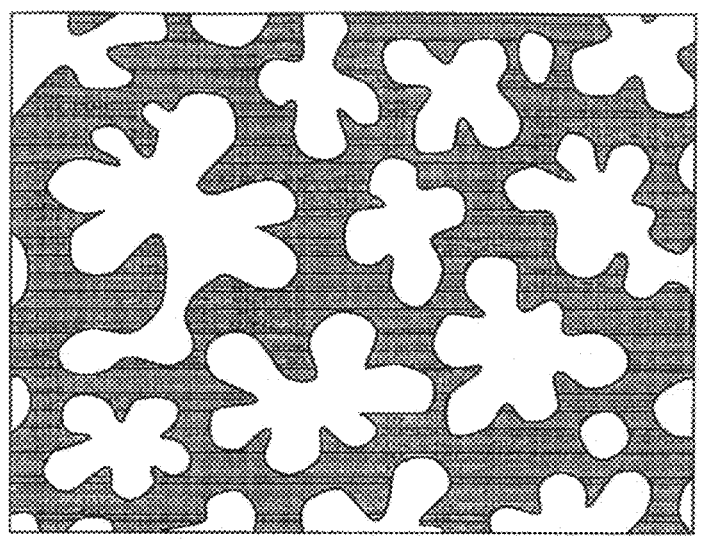
FIG. 28 is a schematic view of the portion outlined by the dotted line in FIG. 27.
Figure 29:
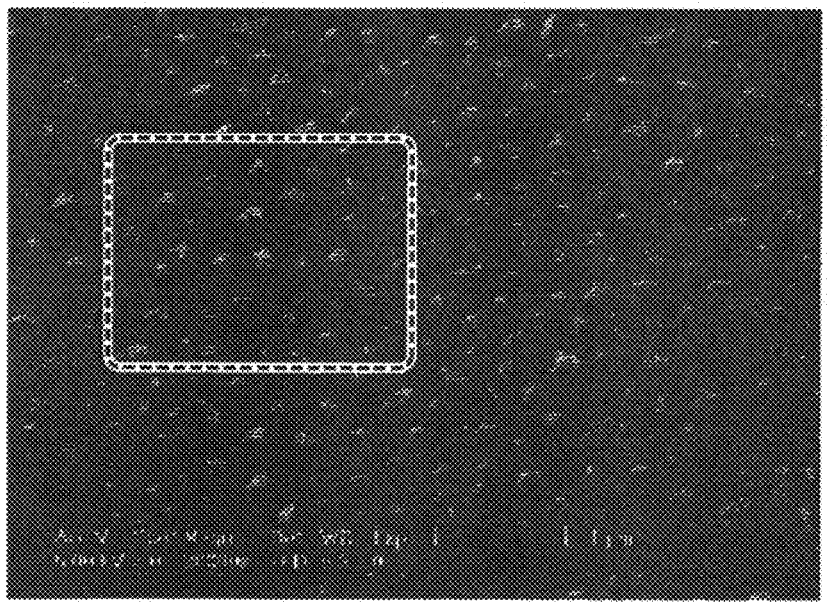
FIG. 29 is a non-enlarged perspective photograph of the moth-eye film produced in Example 7.
Figure 30:
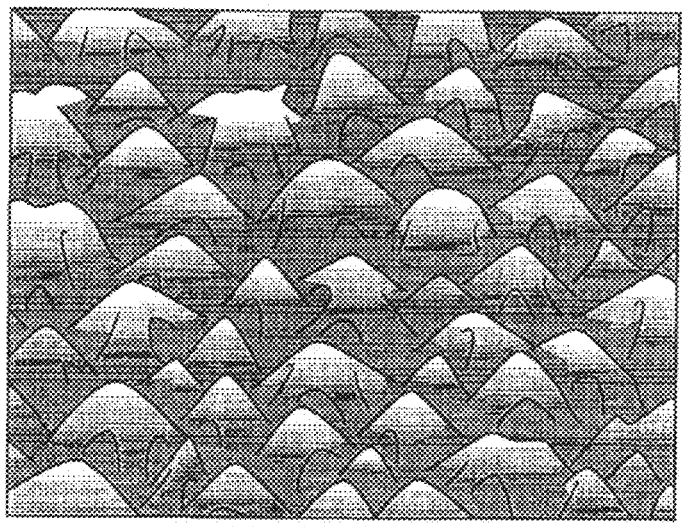
FIG. 30 is a schematic view of the portion outlined by the dotted line in FIG. 29.

FIGS. 23 to 28 are plan photographs of the moth-eye film produced in Example 7 and schematic views of the portion outlined by the dotted line in the corresponding photograph. FIGS. 23 and 24 are before wet-wiping, while FIGS. 25 to 28 are after wet-wiping. Of FIGS. 25 to 28, FIGS. 25 and 26 are not-enlarged views, while FIGS. 27 and 28 are enlarged views. The steps in Example 7 are substantially the same as those in Example 6, but they are different from those in Example 6 in that wet-wiping was performed using pure-water-absorbing BEMCOT (wiper for clean rooms) (Asahi Kasei Corp.) after the moth-eye film was produced through the steps in Example 6. In other words, the moth-eye film produced in Example 7 is a moth-eye film formed by applying 6 J/cm$^2$ of ultraviolet rays to a material to be cured at 6 J/cm$^2$ and wet-wiping the cured material.

Table 4 shows the number of projections included in the photograph and the number density per square micrometer of the moth-eye film produced in Example 7.

TABLE 4

|  | Number | Number density (pcs/µm$^2$) |
|---|---|---|
| Example 7 | 9 | 9.0 |

As is evident from the comparison between Examples 6 and 7, the size of each sticking structure can be increased by wet-wiping. This is because wet-wiping softens the tip portions of the projections of the moth-eye film, and thus adjacent projections are more likely to adhere to each other. As the size of each sticking structure increases, light is much more scattered even though the number of the sticking structures is not changed.

Figure 31:
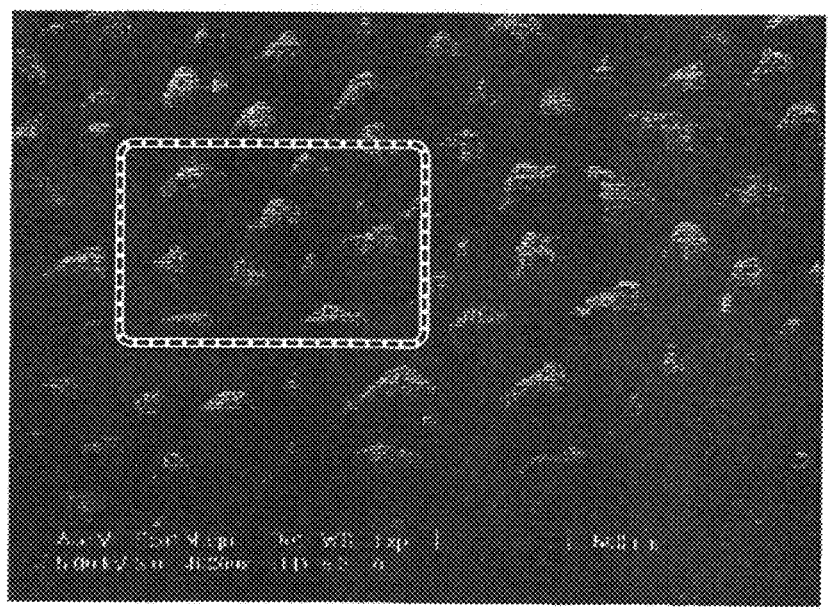
FIG. 31 is an enlarged perspective photograph of the moth-eye film produced in Example 7.
Figure 32:
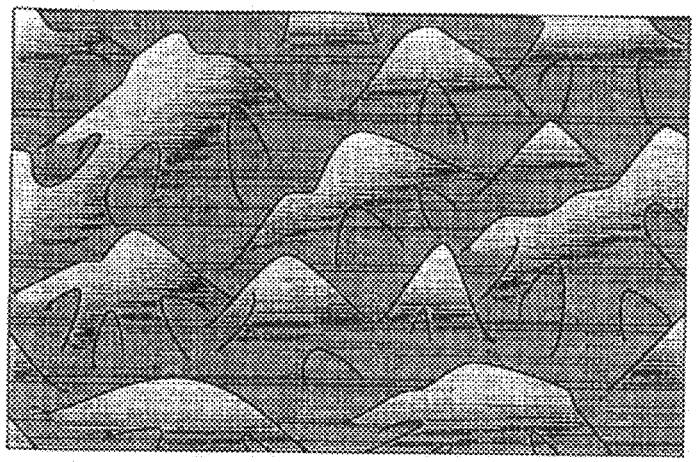
FIG. 32 is a schematic view of the portion outlined by the dotted line in FIG. 31.

FIGS. 29 to 32 are perspective photographs of the moth-eye film produced in Example 7 and schematic views of the portion outlined by the dotted line in the corresponding photograph. Of FIGS. 29 to 32, FIGS. 29 and 30 are not-enlarged views, while FIGS. 31 and 32 are enlarged views. As is evident from FIGS. 29 to 32, shorter sticking structures are formed and a larger number of projections adhere to each other in the case of performing wet-wiping in comparison with the case without wet-wiping.

Embodiment 4

The moth-eye film of Embodiment 4 is different from the moth-eye film of Embodiment 3 in that dry-wiping is performed using a dry BEMCOT after the moth-eye film of Embodiment 3 is formed; in the other respects, the film is the same as that of Embodiment 3. The following will describe the method for producing the moth-eye film of Embodiment 3 referring to Example 8 wherein a moth-eye film was actually produced.

Figure 33:
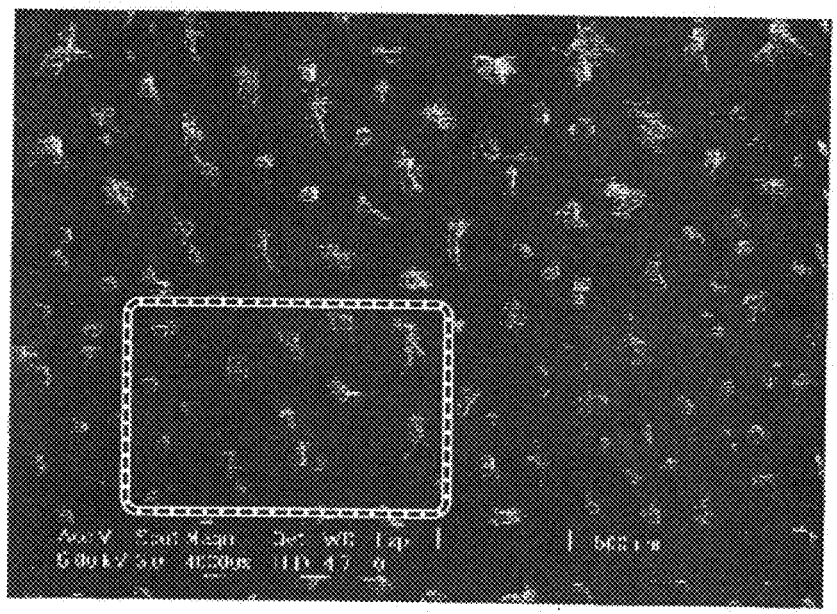
FIG. 33 is a plan photograph of the moth-eye film produced in Example 8.
Figure 34:
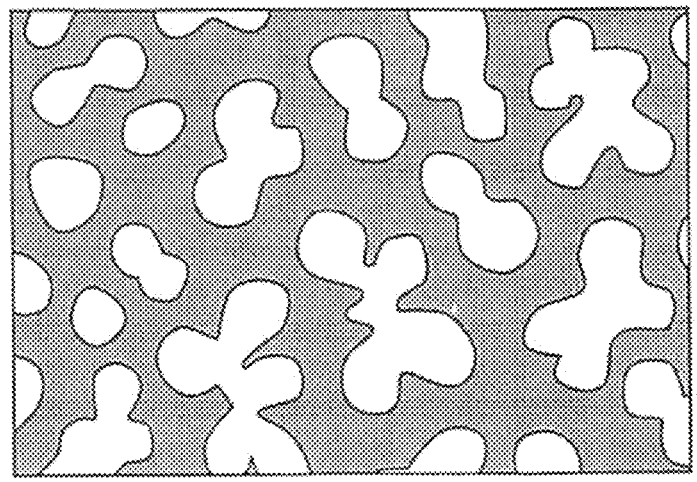
FIG. 34 is a schematic view of the portion outlined by the dotted line in FIG. 33.
Figure 33:
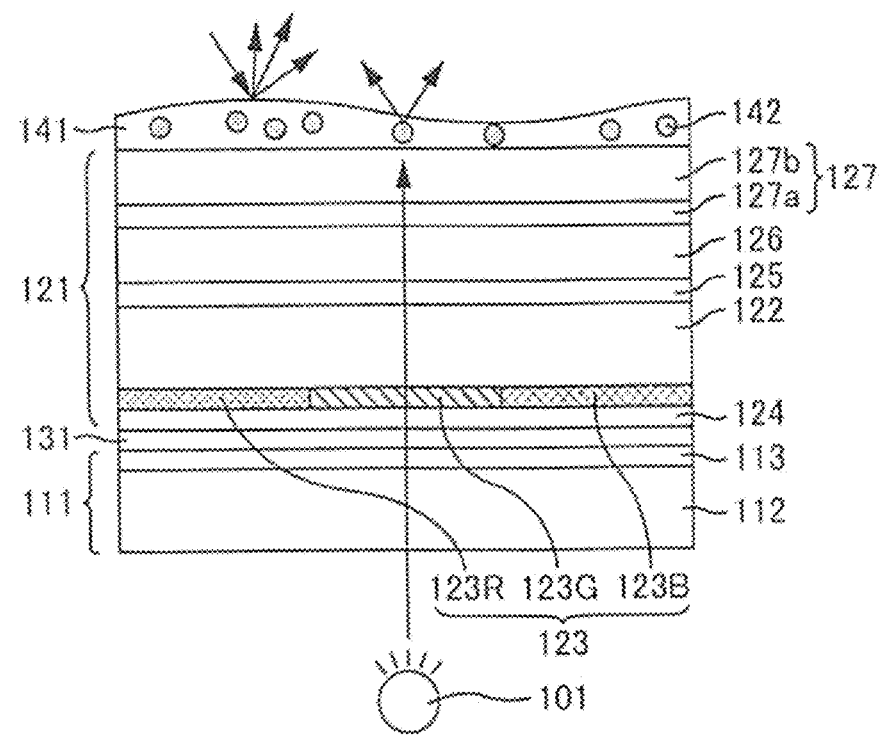
Figure 36:
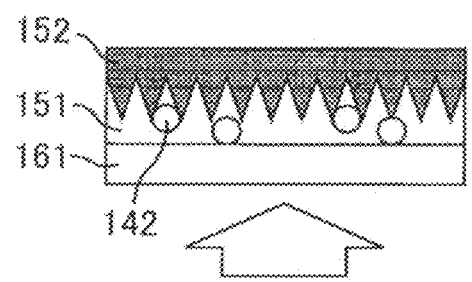
FIG. 36 is a schematic view showing one step of producing the moth-eye film containing fine beads, where light is being applied.
Figure 37:
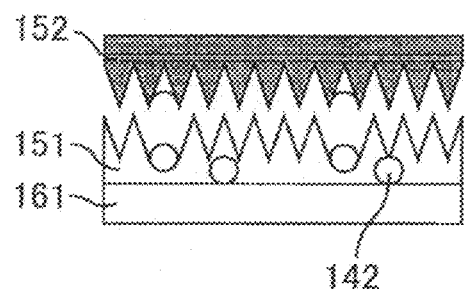
FIG. 37 is a schematic view showing one step of producing the moth-eye film containing fine beads, where a mold is being released.

FIGS. 33 and 34 are a plan photograph of the moth-eye film produced in Example 8 and a schematic view of the portion outlined by the dotted line in the photograph. As is evident from the comparison with the state after wet-wiping, that is, the comparison with FIGS. 27 and 28 which show the state before dry-wiping, a smaller number of projections adhere to each other and the number of sticking structures is smaller after dry-wiping.

The present application claims priority to Patent Application No. 2009-107019 filed in Japan on Apr. 24, 2009 under the Paris Convention and provisions of national law in a designated State, the entire contents of which are hereby incorporated by reference.

EXPLANATION OF SYMBOLS

11, 21: Moth-eye film
12: Projections
13: Base portion
14: Tip portion
15: Sticking structure
16: Substrate
22: Transparent acryl board (substrate)
23: Test object
24: Light source
25: Luminance meter
26, 27: Absorber
101: Backlight
111: Array substrate
112: Glass substrate
113: Transparent electrode
121: Color filter substrate
122: Glass substrate
123: Color filter
123R: Color filter (red)
123G: Color filter (green)
123B: Color filter (blue)
124: Transparent electrode
125: Adhesive layer
126: Retardation film
127: Polarizer film
127a: PVA film
127b: TAC film
131: Liquid crystal layer
141: Antireflection film
142: Fine bead
151: Resin layer to be shaped
152: Mold
161: Substrate

The invention claimed is:

1. An antireflection film, comprising on a surface thereof, a moth-eye structure comprising a plurality of projections such that a width between apexes of adjacent projections is not longer than a wavelength of visible light,
   the moth-eye structure comprising a sticking structure formed when tip portions of the projections are joined to each other,
   the sticking structure being 0.05 μm or greater and smaller than 1 μm in diameter, and
   a density of the number of sticking structures relative to planar area of the antireflection film being 0.01 units/μm$^2$ or more and less than 20 units/μm$^2$.

2. The antireflection film according to claim 1,
   wherein the density of the number of sticking structures relative to the planar area of the antireflection film is 1.3 units/μm$^2$ or more and less than 20 units/μm$^2$.

3. The antireflection film according to claim 1,
   wherein the density of the number of sticking structures relative to the planar area of the antireflection film is 4.0 units/μm$^2$ or more and less than 20 units/μm$^2$.

4. The antireflection film according to claim 1,
   wherein each of the plurality of projections has an aspect ratio of 0.8 or greater and 1.87 or smaller, the aspect ratio denoting a ratio of height to the base length of the projection.

5. The antireflection film according to claim 1,
   wherein each of the plurality of projections has an aspect ratio of 1.0 or greater and 1.87 or smaller, the aspect ratio denoting a ratio of height to the base length of the projection.

6. A display device comprising:
   the antireflection film according to claim 1; and
   multiple pixels,
   the pixels each having a substantially rectangular shape with short sides and long sides, and
   the short sides each being 250 μm or shorter in length.

* * * * *